United States Patent [19]

Wagner

[11] Patent Number: 4,638,290
[45] Date of Patent: Jan. 20, 1987

[54] ELECTRONIC TURN SIGNAL CANCELLATION APPARATUS

[75] Inventor: David J. Wagner, Lake Zurich, Ill.

[73] Assignee: Motorola, Inc., Schaumburg, Ill.

[21] Appl. No.: 736,874

[22] Filed: May 22, 1985

[51] Int. Cl.$^4$ ................................................. B60Q 1/00
[52] U.S. Cl. .................................. 340/56; 200/61.35; 200/61.38
[58] Field of Search ................... 340/52 R, 54, 56, 67, 340/73, 81 R; 200/61.27, 61.3, 61.32, 61.35, 61.38, 61.39

[56] References Cited

U.S. PATENT DOCUMENTS

| | | | |
|---|---|---|---|
| 2,307,357 | 1/1943 | Butow | 177/339 |
| 2,845,608 | 7/1958 | Short | 340/81 |
| 3,316,533 | 4/1967 | Kell | 340/56 |
| 3,562,799 | 2/1971 | Creager et al. | 340/56 |
| 3,955,175 | 5/1976 | Holt | 340/73 |
| 4,058,797 | 11/1977 | Sekiguchi et al. | 340/56 |
| 4,086,894 | 5/1978 | Capurka et al. | 123/148 |
| 4,128,770 | 12/1978 | Okazaki | 307/10 LS |
| 4,254,397 | 3/1981 | Shannon | 340/56 |
| 4,264,891 | 4/1981 | Bergmann et al. | 340/56 |
| 4,323,877 | 4/1982 | Morita et al. | 340/56 |
| 4,333,071 | 6/1982 | Kira et al. | 340/56 |
| 4,403,211 | 9/1983 | Shibata et al. | 340/73 |
| 4,438,425 | 3/1984 | Tsuchida et al. | 340/55 |

Primary Examiner—Charles A. Ruehl
Assistant Examiner—Jeffery A. Hofsass
Attorney, Agent, or Firm—Phillip H. Melamed

[57] ABSTRACT

An electronic turn signal cancellation apparatus is disclosed which includes two separate rotational positions sensing elements, each sensing an associated identifying portion positioned on a shaft rotated in accordance with vehicle steering wheel rotation. An electronic turn signal cancellation circuit, which may be effectively implemented by a microprocessor, effectively analyzes the output signals of these sensors and determines the current angular shaft position and also the previous shaft position. Turn signal cancellation is implemented by determining current shaft position and the direction of rotation of the shaft. One embodiment implements turn signal cancellation without hysteresis, while a second embodiment utilizes similar structure to implement turn signal cancellation with hysteresis. In each case only two sensors are utilized which may be joined together to form a unitary sensor assembly.

15 Claims, 9 Drawing Figures

Fig. 4a $S_A, S_B$ SENSOR CODE Vs. ROTATION ANGLE

Fig. 6a $S_A, S_B$ SENSOR CODE Vs. ROTATIONAL ANGLE

Fig. 6b

ELECTRONIC TURN SIGNAL CANCELLATION APPARATUS

BACKGROUND OF THE INVENTION

The present invention is related to electronic turn signal cancellation apparatus, and more particularly to such apparatus adaptable for use in automatically cancelling vehicle turn signal indications.

Typically electromechanical devices are currently used to provide automatic turn signal cancellation in automobiles after completion of a turn. Such devices primarily sense the angular rotation of the steering wheel to determine when the turn signal should be cancelled. In such devices a right or left turn signal indication is actuated by a driver operated switch and the turn signal indication is cancelled (reset) in response to a mechanical sensor device sensing a predetermined angular rotation of the vehicle steering wheel and then mechanically resetting the driver actuated switch. Typically these electromechanical devices are complex and expensive and comprise many individual mechanical linkage elements. The linkage elements of these devices are subject to mechanical wear and therefore are subject to potential reliability problems. These devices implement the resetting of the turn signal indicator switch in a mechanical, rather than electrical, manner.

Some electronic turn signal cancellation devices have been proposed, but typically these electronic systems utilize a large number of sensors to electronically determine both the direction of steering wheel rotation and the angular rotational position of the steering wheel since both of these pieces of information are needed to properly implement turn signal cancellation. Since a large number of sensors are used in these systems, this increases the cost of such turn signal cancellation systems to the point that these systems have not been readily commercially utilized in the automobile industry. Also, since the sensors are typically positioned at widely different angular locations this complicates the installation of the sensors.

In addition to the above deficiencies of prior systems, typically turn signal cancellation is accomplished without any hysteresis, meaning that once a predetermined angular position has been achieved by turning the steering wheel in a predetermined direction, even a very small reverse rotation of the steering wheel may result in cancellation of the turn signal. Many times this is undesirable since the actual vehicle turn may not have been completed. While some prior systems have noted that hysteresis may be desirable, their implementation apparatus does not appear to be readily adaptable to the utilization of a minimum number of positions sensors such that these systems also are not cost effective.

SUMMARY OF THE INVENTION

An object of the present invention is to provide an improved electronic turn signal cancellation apparatus which utilizes a minimum number of rotation position sensors and thereby overcomes the above mentioned deficiencies of the prior cancellation systems.

A more specific object of the present invention is to provide an improved electronic turn signal cancellation apparatus which requires only two angular position sensors.

A further object of the present invention is to provide an improved electronic turn signal cancellation apparatus in which hysteresis is implemented for both right and left turn signal cancellation while utilizing only a total two angular position sensors.

In one embodiment of the present invention an electronic signal cancellation apparatus is provided. The electronic signal cancellation apparatus comprises: a shaft rotatable about an axis and rotated in accordance with the rotation of a vehicle steering wheel; first and second means fixed to said shaft and rotatable therewith, said first and second means positioned at different relative angular positions about said shaft axis with respect to each other and axially spaced apart from each other; first and second sensor means located separate from and about said shaft and positioned axially spaced apart from each other and at fixed angular positions with respect to said shaft axis; said first sensor means associated with and positioned for sensing the rotation of said first means about said axis and providing a first sensor output signal in accordance therewith, said first output signal being unresponsive to the rotation of said second means, and said second sensor means being associated with and positioned for sensing the rotation of said second means about said axis and providing, in response thereto, a second sensor output signal independent of said first output signal, said second output signal being unresponsive to the rotation of said first means, each of said first and second output signals, respectively, related to the rotational positions of said first and second means about said axis; and means for receiving said first and second output signals and providing separate right/left turn signal cancellation signals in accordance therewith.

Essentially, the above stated embodiment of the present invention utilizes first and second rotational position sensors to implement turn signal cancellation, and this is accomplished by having each of these sensors sense separate identifying portions, corresponding to the first and second means, which are attached to the rotatable shaft. This is more specifically accomplished by analyzing the output signals of the first and second sensors to determine the actual angular position of the rotating shaft and its direction of rotation. This is accomplished by noting the present and previous states of the output signals provided by the first and second sensors.

By utilizing the above noted structure, the present invention can readily implement hysteresis in turn signal cancellation, if that is desired. In addition, both the first and second sensors can be joined together and form a unitary sensor assembly in which each sensor is just slightly axially spaced apart from each other, and this simplifies installation of the sensor assembly and reduces the cost of the electronic turn signal cancellation apparatus.

The above noted features and advantages of the present invention, as well as many others, will be more fully understood by referring to the following detailed explanation of the present invention.

BRIEF DESCRIPTION OF THE DRAWINGS

For a more complete understanding of the present invention reference should be made to the drawings in which.

DESCRIPTION OF THE PREFERRED EMBODIMENT OF THE INVENTION

Figure 1:
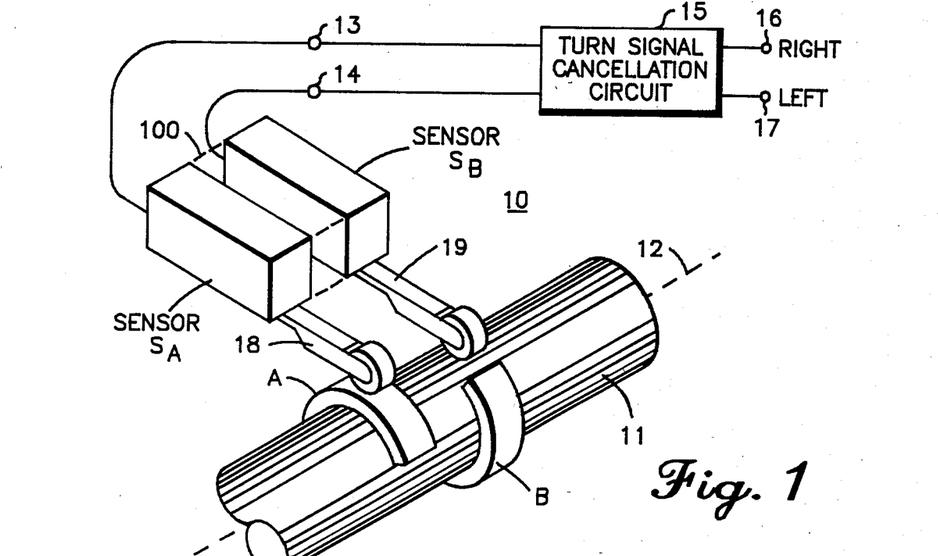
FIG. 1 is a combination perspective and schematic view of an electronic turn signal cancellation apparatus constructed in accordance with the present invention.

Referring to FIG. 1, a turn signal cancellation apparatus 10 is illustrated as comprising a shaft 11 rotatable about an axis 12 wherein the shaft is rotated in accordance with the rotation of a vehicle steering wheel (not shown). First and second cams (means) A and B are fixed to tne shaft 11 and rotatable therewith and the cams A and B are positioned at different relative angular positions about the axis 12 with respect to each other while being axially spaced apart from each other. The cams A and B comprise raised angular position identifying portions attached to the shaft 11. Each identifying portion cam extends continuously over less than a 360° circumferential angle about the shaft 12, and the identifying portions are angularly shifted with respect to each other so that they identify different angular positions of the shaft. Some portions of the identifying portions may overlap and therefore be located concurrently at the same angular position with respect to the shaft axis.

First and second fixed sensors $S_A$ and $S_B$ are located separate from and about the shaft 11 and positioned axially spaced apart from each other and at fixed angular positions with respect to the shaft axis 12. Thus the sensors $S_A$ and $S_B$ are stationary with respect to the rotatable shaft 11, and they may be mechanically joined together to form a unitary sensor assembly since the sensors may be positioned at substantially the same angular position and only slightly axially spaced apart. The joining of the sensors $S_A$ and $S_B$ to form a unitary assembly 100 is shown dashed in FIG. 1 and designated by reference numeral 100. The sensor $S_A$ is associated with and positioned effectively adjacent to the cam A such that it will sense the rotation of the cam A and provide, at a terminal 13, a first sensor output signal in accordance with the rotation of the cam A. It should be noted that the first output signal at the terminal 13 is unresponsive to the rotation of the cam B. Similarly, the second sensor $S_B$ is associated with and positioned for sensing the rotation of tne cam B and providing, in response thereto, an output signal at a terminal 14 which is unresponsive to the rotation of the cam A. A turn signal cancellation circuit 15 receives both of the sensor signals provided at terminals 13 and 14 and provides separate right or left turn signal cancellation outputs signals at output terminals 16 and 17, respectively.

It should be noted that FIG. 1 illustrates the sensors $S_A$ and $S_B$ as comprising microswitches having extending sense arms 18 and 19, respectively, which cooperate with raised cam areas A and B. However, of course other types of sensors and effective cams can be utilized without substantial departure from the teachings of the present invention. Thus, for example, Hall effect magnetic sensor devices can be utilized for the sensors and cooperate with raised metallic portions corresponding to the mechanical cams A and B. In addition, other types of sensor configurations involving light sources and photodiodes can also be utilized. The basic function of the sensors $S_A$ and $S_B$ and the cams A and B is to provide two independent and different rotational position signals describing the rotational position of the shaft 11. The turn signal cancellation circuit 15 will then process these two independent signals to effectively determine the direction of rotation of the shaft 11 as well as the actual angular rotational position of the shaft 11 and then the turn signal cancellation circuit will properly automatically generate the right and left turn signal cancellation signals at the correct time. The operation of the turn signal cancellation circuit 15 will now be discussed.

Figure 2:
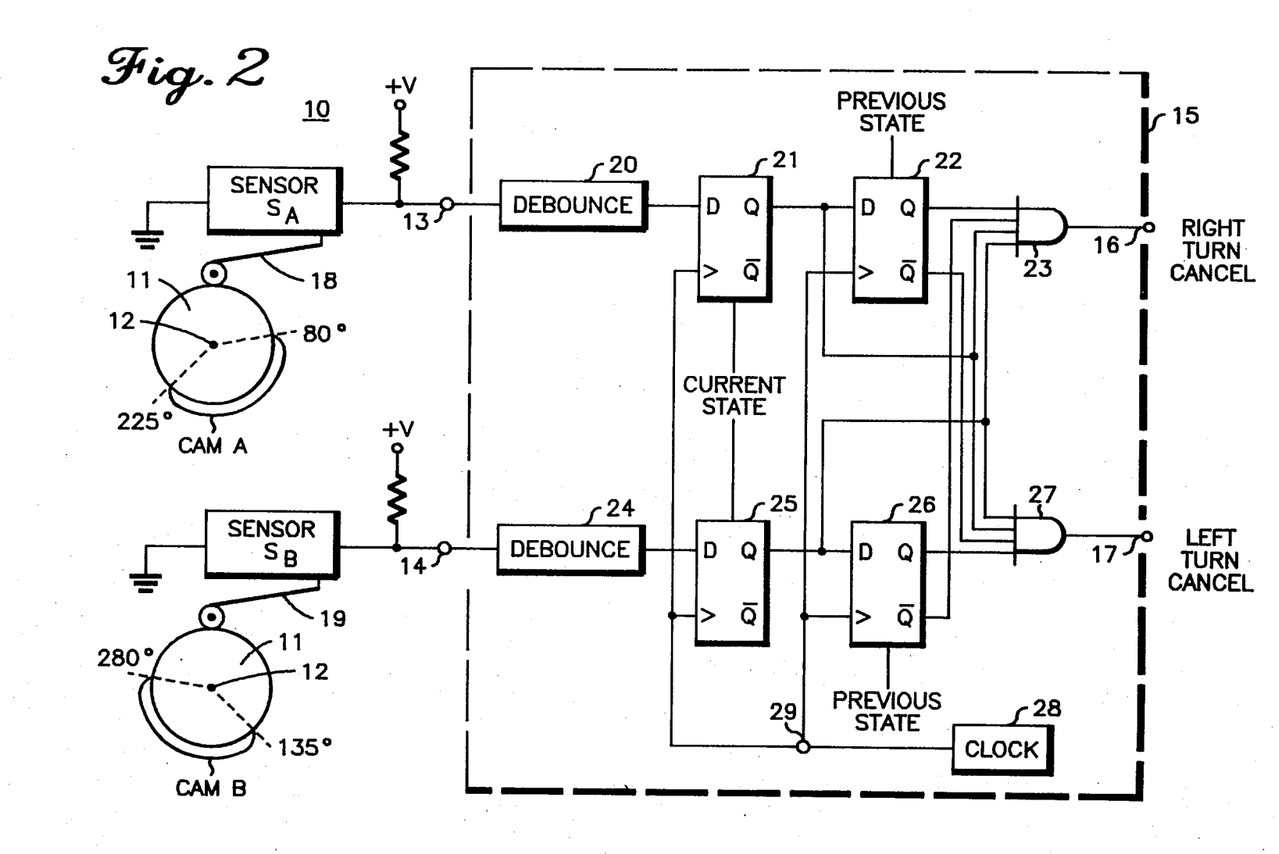
FIG. 2 is a schematic diagram illustrating, in more detail, certain portions of the turn signal cancellation apparatus shown in FIG. 1.
Figure 5:
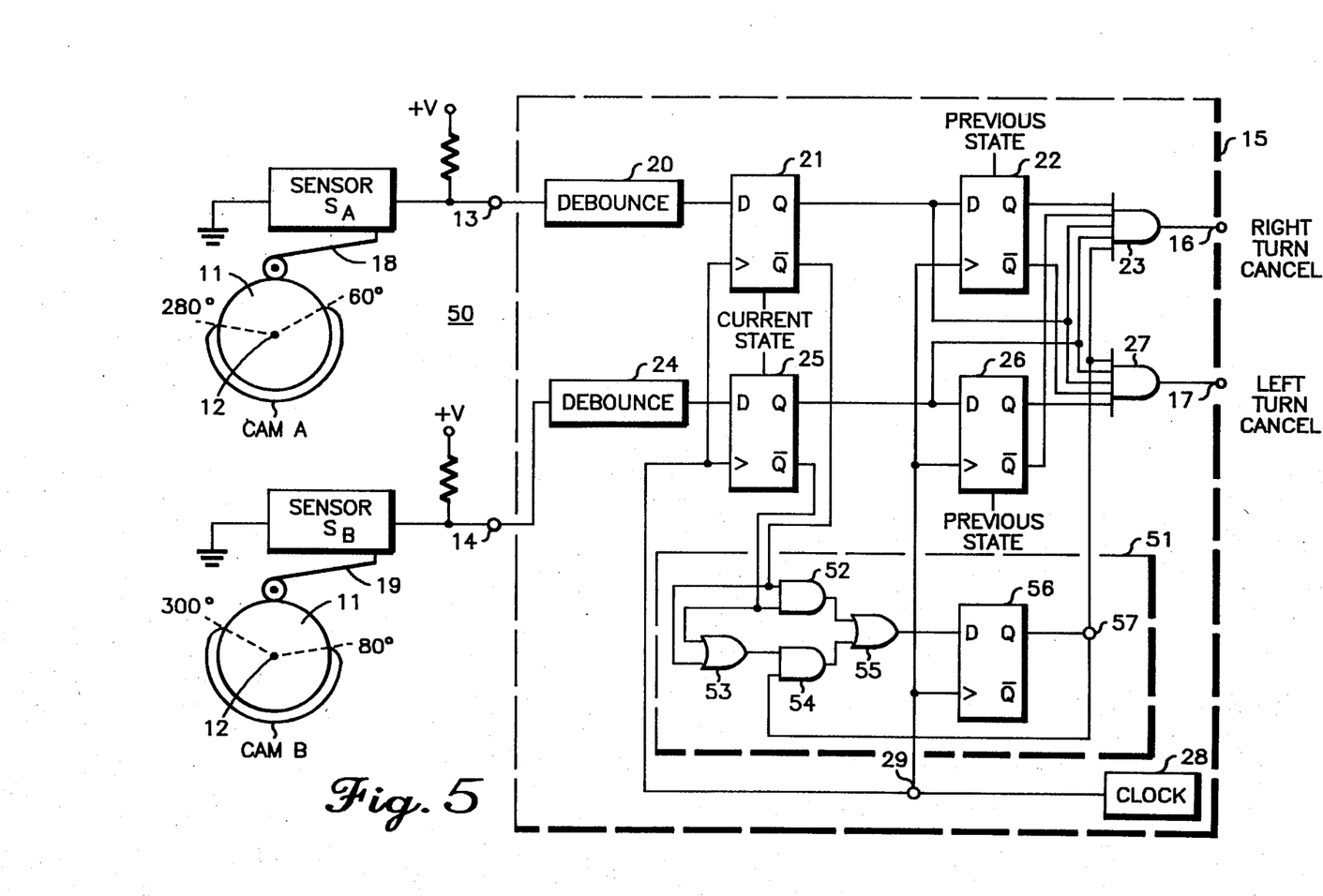
FIG. 5 comprises a schematic diagram similar to FIG. 2 in which an electronic turn signal cancellation apparatus, with hysteresis, is illustrated.

Referring now to FIG. 2, the turn signal cancellation apparatus 10 is depicted in schematic form, and details of the turn signal cancellation circuit 15 and the angular positioning of the cams A and B are illustrated. It should be noted that the turn signal cancellation apparatus 10 in FIG. 2 does not implement hysteresis, whereas FIG. 5 illustrates a similar turn signal cancellation apparatus embodiment which does implement hysteresis.

As shown in FIG. 2, cam A is disposed about the shaft 11 over an angle of 80° to 225° with respect to a nominal angular position of 0° corresponding to the rotational position of the shaft 11 as shown in FIG. 2. Cam B is disposed over an angular rotational position of 135° to 280° with respect to the 0° angular position of the shaft 11 as shown in FIG. 2. The sensors $S_A$ and $S_B$ are illustrated in FIG. 2 as comprising microswitches with sensing arms 18 and 19 contacting the shaft 11 and the cams A and B, respectively, during shaft rotation. For sensor $S_A$, when its sensing arm contacts the shaft 11 instead of the cam A, a switch internal to the sensor $S_A$ is left open thus providing a high (logic 1) signal at the terminal 13. When the sensing arm 18 of the sensor $S_A$ contacts its associated cam A, the sensing arm is displaced and this closes the internal switch and results in a low (0 logic) signal at the terminal 13. The operation of the sensor $S_B$ is similar. The end result is that 1 and 0 logic signals are provided by the sensors $S_A$ and $S_B$ at the terminals 13 and 14 and these signals together generally indicate the current angular position of the rotatable shaft 11.

The terminal 13 is connected to a debounce circuit 20 which provides a debounced sensor output signal as an input to a data terminal D of a current state flip-flop 21. An output terminal Q of this flip-flop is connected as an input to a data terminal D of a previous state flip-flop 22 which has an output terminal Q connected as an input to an AND gate 23 whose output provides the right turn cancellation signal at the terminal 16. The terminal 14 is connected to a debounce circuit 24 which provides a debounced sensor input signal to a data terminal D of a current state flip-flop 25 which has an output terminal Q connected as an input to a data terminal D of a previous state flip-flop 26. The flip-flop 26 has an output terminal Q connected as an input to AND gate 27 whose output provides the left turn cancellation signal at the terminal 17. Each of the Q output terminals of the flip-flops 21 and 25 is also connected as an input to each of the AND gates 23 and 27. An inverted output terminal $\overline{Q}$ of the flip-flop 22 is connected as an input to the AND gate 27 while an inverted output terminal $\overline{Q}$ of the flip-flop 26 is connected as an input to the AND gate 23. In addition, a clock or timing circuit 28 is provided in the turn signal cancellation circuit 15 and provides timing pulses at a terminal 29. These timing pulses effectively serve as sampling pulses and are connected to clock input terminals of each of the flip-flops 21, 22, 25 and 26. All of the components 20–29 are contemplated as comprising the turn signal cancellation circuit 15 shown dashed in FIG. 2.

Figure 3A:
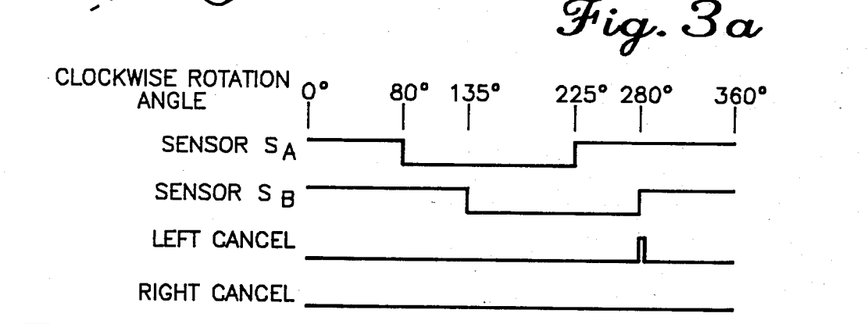
FIGS. 3a and 3b comprise two series of graphs which illustrate sensor waveforms and output signals provided by the turn signal cancellation apparatus shown in FIGS. 1 and 2.
Figure 3B:
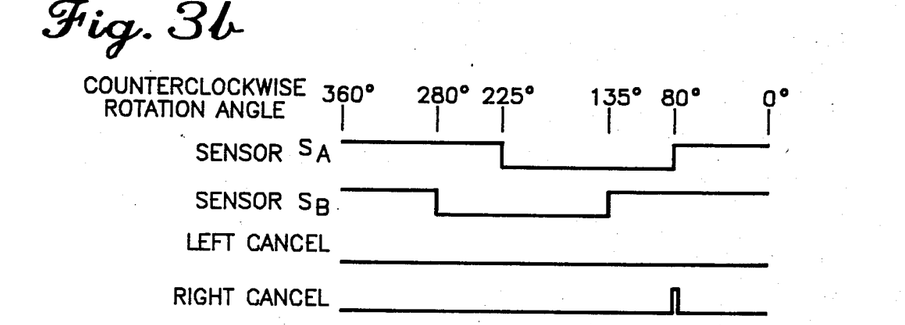

Referring to the graphs in FIG. 3a, the outputs of the sensors $S_A$ and $S_B$ are illustrated for clockwise rotation of the shaft 11. Similarly, the graphs in FIG. 3b illustrate the sensor outputs for counterclockwise rotation of the shaft 11. In both cases an initial or nominal position of the shaft 11 is assumed to correspond to the position shown in FIG. 2. It should be noted that in FIG. 2 the shaft 11 is actually illustrated twice for the purpose of clarity, once in association with cam A and once in association with cam B. It should also be noted that the nominal position of the shaft 11 corresponding to 0° rotation of the shaft generally corresponds to the angular rotational position at which the sensing arms 18 and 19 and the sensors $S_A$ and $S_B$ are effectively positioned, except for the sensors and their sensing arms being axially spaced apart so as to sense the cams A and B, respectively, which are axially spaced apart.

In the graphs in FIG. 3a a signal entitled Left Cancel is illustrated as having positive pulse when the shaft 11 is rotated clockwise passed 280°, while no such pulse is provided for a right turn cancellation signal (Right Cancel). These signals correspond to the signals at the terminals 17 and 16, respectively. Similarly, during a counterclockwise rotation of the shaft 11 the graphs in FIG. 3b illustrate that a right turn cancellation signal is produced at an 80° rotational position of the shaft while no left turn signal cancellation signal is provided. This can best be understood by referring to FIGS. 4a and 4b in conjunction with FIG. 2.

Figure 4A:
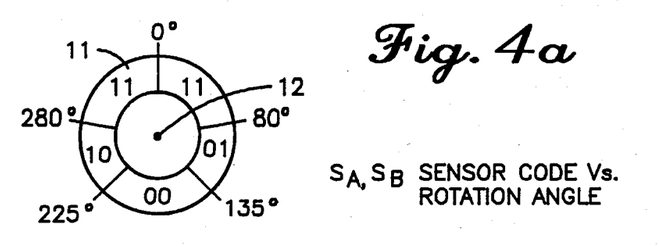
FIG. 4a comprises a graphic illustration of turn signal sensor output signals as a function of rotational angle, while FIG. 4b comprises a flowchart which illustrates how the present invention utilizes the turn signal sensor signals to properly generate right and left turn signal cancellation signals.
Figure 4B:
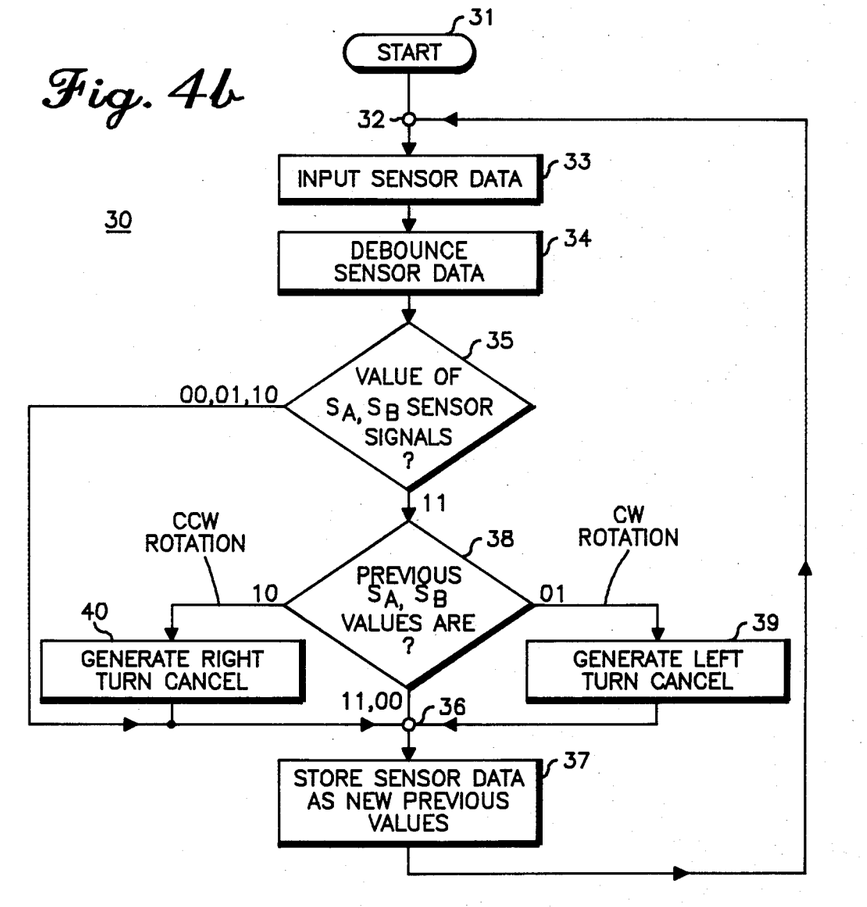

FIG. 4a is a graphic representation of the logic states of the $S_A$ and $S_B$ sensor signals as a function of the angular rotation of the shaft 11. FIG. 4a clearly illustrates that for angular positions between 280° and 80°, the sensors $S_A$ and $S_B$ will both produce high logic output states corresponding to one logic states. Similarly, for angular positions of the shaft 11 between 135° and 225° each of the sensors produces a low or 0 logic state. Between 80° and 135° the sensor $S_A$ produces a 0 logic state while the sensor $S_B$ produces a 1 logic state, and the reverse is true for the angular position between 225° and 280°. The function of the turn signal cancellation apparatus 15 is to interpret not only the present logic states provided by the sensors, but the previous logic states so as to determine the direction of rotation of the shaft 11 as well as its present angular position. Utilizing both of these pieces of information, the turn signal cancellation apparatus then implements providing a proper turn signal cancellation signal. This is best illustrated by referring to the flowchart shown in FIG. 4b which not only represents the operation of the circuit 15 shown in FIG. 2, but also represents the flowchart for a preferred embodiment of the present invention in which the functions of the cancellation circuit 15 are implemented by the programming of a microprocessor. In FIGS. 4a and 4b the output states of the sensors $S_A$ and $S_B$ are represented by a two digit number wherein the first number is the logic state of the sensor $S_A$ and the second number is the logic state of the sensor $S_B$.

Referring to FIG. 4b, a flowchart 30 is illustrated which corresponds to the operation of the turn signal cancellation circuit 15 shown in FIG. 2. The flowchart 30 also represents the basic programming of a microprocessor which can implement the basic functions of the circuit 15.

The flowchart 30 is entered at an initializing terminal 31 and proceeds to a summing terminal 32. From there the flowchart preceeds to a process block 33 which represents inputting the sensor data information provided by the sensors $S_A$ and $S_B$ to the cancellation circuit 15. If the cancellation circuit comprises a microprocessor, this can be considered to represent having the microprocessor periodically look at (sample) the data on its input terminals corresponding to the terminals 13 and 15 and effectively provide a related held magnitude. From the process block 33 control passes to a process block 34 which is representative of the debounce circuits 20 and 24 which effectively debounce the sensor signals at the terminals 13 and 14. This debouncing function essentially consists of providing noise immunity for the sensor signals by insuring that any logic state produced at the terminals 13 and 14 is not merely a transient state which may have been caused by noise. Discrete debouncing circuits are well known and implementing such a debouncing function with a program used microprocessor is also conventional.

It should be noted that the control sequence of process blocks 33 and 34 could be reversed and equivalent performance be obtained. For the circuit shown in FIG. 2, a reversal of these blocks is appropriate since first the $S_A$ and $S_B$ signals are debounced, and then the debounced signals are sampled and held by the flip-flops 21 and 25.

From the process block 34 control passes to a decision block 35 which essentially inquires what is the present sampled logic state of the sensor signals provided by the sensors $S_A$ and $S_B$. It should be noted that the reference dessignations $S_A$ and $S_B$ are used herein to refer to both the sensors and their associated output signals. If the decision block 35 determines that either a 00, 01 or 10 logic state is provided by the sensors $S_A$ and $S_B$, then control passes to a summing terminal 36 and from there to a process block 37 which effectively stores these current sampled sensor signals as "previous" signals. Control then recycles back to the input summing terminal 32 for reexecution of flowchart steps 33–35. It is contemplated that this reexecution will occur at periodic or aperiodic predetermined time intervals, and in FIG. 2 this accomplished by the clock 28 providing periodic timing pulses at the terminal 29 resulting in clocking all of the flip-flops in the turn signal cancellation circuit 15. For both the discrete circuit 15 in FIG. 2 and any microprocessor implementation thereof in accordance with the flowchart 30, effective sampling pulses are effectively provided to implement repetitive operation.

With regard to storing the current values of the sensor signals $S_A$ and $S_B$ as previous sensor values, this is accomplished by the current flip-flops 21 and 25 having their outputs coupled as inputs to the data terminals of the previous state flip-flops 22 and 26. This effectively results in the sampled and held magnitudes of the current state flip-flops 21 and 25 being sampled by the previous state flip-flops 22 and 26 for each sampling pulse produced at the terminal 29. Of course it is understood that an inherent delay in the flip-flops insures that the previous flip-flops 22 and 26 sample the held outputs of the flip-flops 21 and 25 prior to these flip-flops changing state in response to a sampling pulse. If inherent delays are not sufficient, of course a delay circuit could be inserted between the terminal 29 and the clock terminals of the flip-flops 21 and 25 to insure proper operation of the circuitry shown in FIG. 2.

For practical embodiments of the discrete circuit 15 shown in FIG. 2 (and circuit 50 in FIG. 5), indeterminate Q and $\bar{Q}$ output states of the flip-flops 22 and 26 are possible for short periods of time during flip-flop transitions. To remedy this potential problem, the outputs at terminals 16 and 17 could be gated with the inverse of the sampling pulses from clock 28 to mask any transitional output changes.

The flowchart 30 in FIG. 4b illustrates that if the decision block 35 determines that the sensor signals $S_A$ and $S_B$ are both providing a high logic state, indicating that the shaft 11 is between 280° and 80° of rotation, then process control passes to a decision block 38 which effectively inquires as to the magnitudes of the stored previous values of the sensor signals $S_A$ and $S_B$ wherein these previous sensor signal values are the ones that existed at the previous sampling pulse provided by the clock 28 which corresponds to the last (previous) time the flowchart 30 monitored the current state of the sensors $S_A$ and $S_B$. If the decision block 38 determines that the previous sensor signal outputs were also 11, or 00 (where 00 is apparently a default situation since this should never occur), then control also passes to the summing terminal 36 and then on to the process block 37. In other words, if the angular position is currently between 280° and 80°, and at the previous sampling pulse the angular position was also between those same two angular positions, then nothing will happen. Of course it is contemplated that the sampling time intervals are sufficiently rapid so as to detect any rotation of the shaft 11. This presents no problem since it merely involves having the clock 28 operate at a relatively high frequency or insuring that a microprocessor implementing the flowchart 30 has a sufficiently rapid execution time for the flowchart, since instantaneous rotation of the steering wheel shaft 11 over a relatively large number of rotational degrees is not physically possible.

If the decision block 38 determines that the previous sensor signals $S_A$ and $S_B$ were 01 this indicates that the shaft 11 is being rotated clockwise. This is because in order to execute the decision block 38, the present sensor signals must have logic states of 11, and since the previous logic states were 01, this indicates a clockwise rotation of the shaft 11. In this case, control passes from the decision block 38 to a process block 39 which generates a left turn cancellation signal wherein this signal will be provided at the terminal 16. Then control passes back to the summing terminal 36. Similarly, if the decision block 38 determines that the previous sensor output signals comprise a logic state of 10, counterclockwise rotation of the shaft 11 is concluded and control passes from decision block 38 to process block 40 which generates a right turn cancellation signal at the terminal 17. Control then also passes back to the summing terminal 36.

It should be noted that the decision blocks 35 and 38 actually determine not only the present angular position of the rotating shaft 11, but also the current rotational direction of the shaft 11. In the circuit 15 shown in FIG. 5, this is implemented by having the current state flip-flops 21 and 25 and the previous state flip-flops 22 and 26 provide inputs to the AND gates 23 and 27. It should be noted that the AND gates 23 and 27 can only produce an output when both of the flip-flops 21 and 25 produce a high logic state at their output terminals, and this corresponds to a shaft rotational position of between 280° and 80°. When this condition is encountered, the logic states of the previous state flip-flops 22 and 26 will determine which of the AND gates 23 or 27 will be activated assuming that during the previous occurrence of a sampling pulse the shaft 11 was not already within the angular position of 280° to 80°.

It should be noted that the embodiments discussed so far implement turn signal cancellation by providing cancellation signals at the terminals 16 and 17. While not shown, it is understood that these cancellation signals result in effectively cancelling turn signal turn-on signals which are preferrably implemented in response to operator controlled vehicle switches that are manually depressed when the vehicle operator wants to indicate a right or left turn. Thus essentially the vehicle operator will set what appears to be an effective control flip-flop to turn on a desired turn signal, and the cancellation circuit 15 will automatically reset the control flip-flop at the appropriate time. Of course additional cancellation features such as providing for cancellation of any turn signal after a predetermined amount of time or after traveling a predetermined distance can also be incorporated into the present embodiment.

The embodiments discussed so far have not been intended to implement any hysteresis in turn signal cancellation. In other words, if a left turn signal was turned on by the vehicle operator, the vehicle operator will then subsequently implement counterclockwise rotation of the steering wheel, and the associated shaft 11, to implement a left turn of the vehicle. During a subsequent clockwise rotation of the steering wheel the process block 39 in FIG. 4b would generate a left turn cancellation signal effectively cancelling the left turn signal. As long as the vehicle operator initially rotated the steering wheel (shaft 11) counterclockwise past the 80° angular position, when the shaft 11 passed clockwise through this same position the process block 40 would generate a left turn cancellation signal. As was previously mentioned, sometimes hysteresis is desired since the above stated operation could result in a slight unintentional clockwise rotation of the steering wheel about the 80° angular position causing cancellation of the turn signal prior to actual completion of the turn. FIG. 5 illustrates a turn signal cancellation apparatus which implements hysteresis and functions similarly to the apparatus shown in FIG. 2.

In essence, turn signal cancellation occurs by determining when the shaft 11 has been rotated in a predetermined direction past at least a first angular position and then rotated in an opposite direction to a position less than a second angular position. Without hysteresis the first and second positions are substantially coincident, while with hysteresis there is significant angular difference between the first and second positions.

Referring to FIG. 5, a turn signal cancellation apparatus 50 is illustrated which is similar to the cancellation apparatus 10 shown in FIG. 2. In FIG. 5, elements of the apparatus 50 which correspond to similar elements of the apparatus 10 are identified by identical reference designations. The basic difference between the apparatus 50 and the apparatus 10 is that the cams A and B are disposed over different angles and that the turn signal cancellation circuit 15 has a hysteresis circuit 51 added to it.

In FIG. 5, the cam A is disposed over angular positions of the shaft 11 corresponding to 60° through 280° while the cam B is disposed over 80° to 300°. In addition, the current state flip-flops 21 and 25 each have an inverted output terminal $\bar{Q}$ connected as an input to an AND gate 52 and also as an input to an OR gate 53. The OR gate 53 provides an input to an AND gate 54, and the outputs of the AND gates 52 and 54 are each connected as inputs to an OR gate 55 whose output is coupled to a data terminal D of an enable flip-flop 56. An output terminal Q of the flip-flop 56 is coupled to an enable output terminal 57 which is coupled as an input to each of the AND gates 23 and 27, as well as being coupled as an input to the AND gate 54. In addition, a clock terminal of the enable flip-flop 56 is connected to the terminal 29. The components 52-57 comprise the hysteresis circuit 51 which modifies the turn cancellation circuit 15 so as to implement hysteresis. This will now be explained in detail.

Figure 6A:
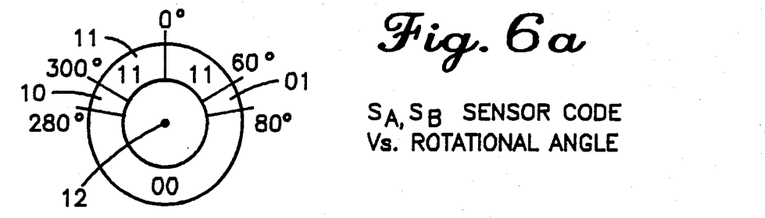
FIG. 6a is a graphic illustration of the sensor signals provided by the cancellation apparatus in FIG. 5 as a function of rotational angle, while FIG. 6b comprises a flowchart illustrating the operation of the apparatus shown in FIG. 5.

Referring to FIG. 6a, a graphic representation of the output logic states of the sensor signals $S_A$ $S_B$ is provided as a function of the rotational position of the shaft 11. For rotational positions between 300° and 60°, the sensors $S_A$ and $S_B$ provide a 11 logic state, while for shaft angular positions between 80° and 280° a 00 logic state is provided. Between 60° and 80° of angular rotation of the shaft 11, a 01 logic state is provided for the sensor signals $S_A$ and $S_B$, while between 280° and 300° a 10 logic state is provided. Providing these sensor signal outputs, in combination with the hysteresis circuit 51, enables the turn cancellation circuit 50 in FIG. 5 to implement 20° of hysteresis for either right or left turn signal cancellation, and this is accomplished by utilization of only two sensors. This will now be discussed in conjunction with the flowchart shown in FIG. 6b.

Figure 6B:
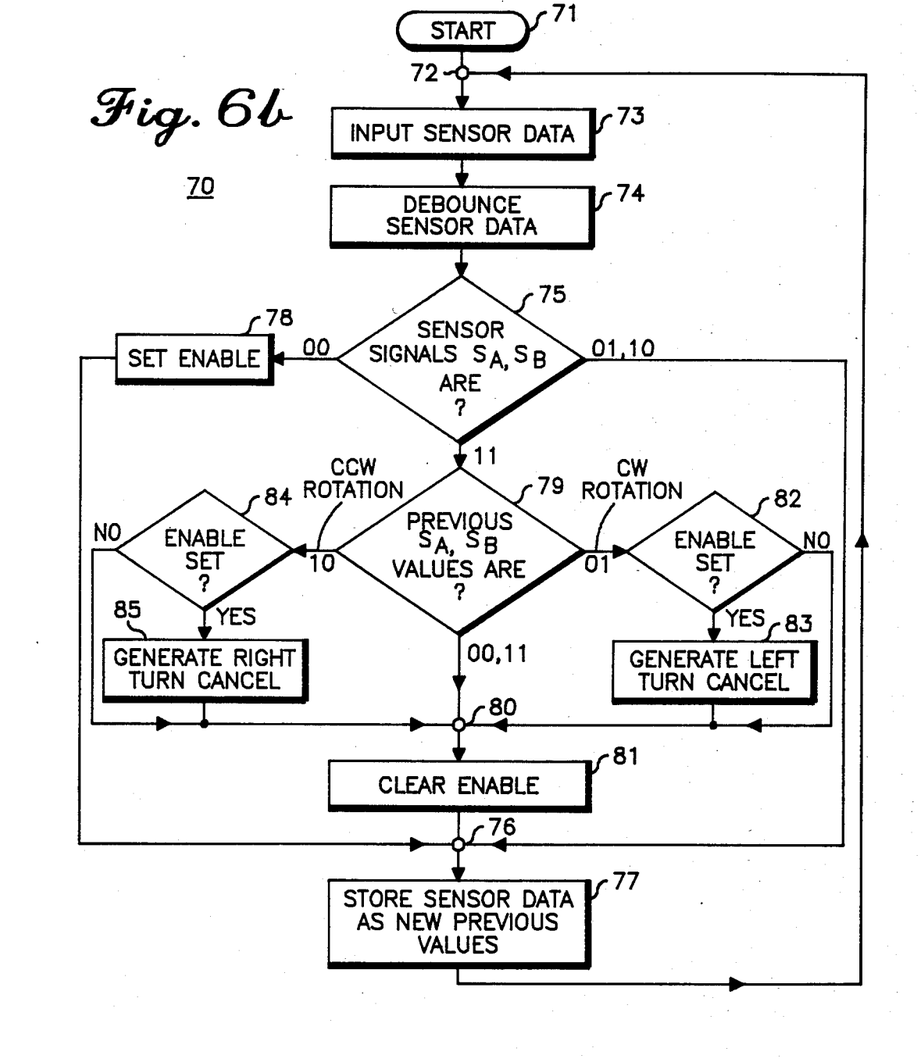

FIG. 6b illustrates a flowchart 70 corresponding to the operation of the turn cancellation circuit 50 shown in FIG. 5 wherein either the circuitry shown in FIG. 5 implements the desired functions, or, preferably, a microprocessor implements these functions. The flowchart 70 is entered at an initializing point 71 and proceeds to a summing terminal 72. From there control passes to a process block 73 which effectively results in inputting the sensor data provided by the sensors $S_A$ and $S_B$. Control then passes to a debounce process block 74. Thus far, the flowchart 70 directly corresponds to the flowchart 30 in FIG. 4b.

From the process block 74, control passes to a decision block 75 which effectively analyzes the sampled present sensor data and determines which one of three control paths is to be followed. If the received sensor data corresponds to a 01 or 10 logic state, control passes to a summing terminal 76, and from there to a process block 77 which stores the current sampled sensor data as previous sensor data. Then control returns to the summing terminal 72 to implement reexecution of the flowchart 70. If the decision block 75 determines that a 00 logic state is present for the sensor signals $S_A$ and $S_B$, control passes to a set enable process block 78. This effectively corresponds to setting an enable flag by noting when the shaft 11 has effectively been rotated either counterclockwise past the 80° angular position or clockwise past the 280° angular position. In FIG. 5 this is accomplished by setting the output of the enable flip-flop 56 high in response to the current state flip-flops 21 and 25 both providing high inverted output signals to the AND gate 52. From the process block 78 control passes to the summing terminal 76 and then on to the process block 77.

If the decision block 75 determines that a 11 logic state is currently provided by the sensors, control passes to a decision block 79 which further inquires as to the previous values of the sensor signals $S_A$ and $S_B$. If the previous sensor values were 00 or 11, control passes to a summing terminal 80 and from there to process block 81 which results in clearing the enable flag (resetting the output of the flip-flop 56 to a low state). Control then proceeds to the summing terminal 76.

If the decision block 79 determines that sensors $S_A$ and $S_B$ previously provided a 01 logic state, it concludes that clockwise (CW) rotation is taking place and control passes to a decision block 82 which inquires if the enable flag has been set. If the enable flag is set, control passes to a process block 83 which generates a left turn cancellation signal and then control passes to the summing terminal 80. If the decision block 82 determines the enable flag is not set, then control passes directly to the summing terminal 80.

Similarly, if the decision block 79 determines that the sensors $S_A$ and $S_B$ previously provided a 10 logic state, it concludes counterclockwise (CCW) rotation for the shaft 11 and control passes to a decision block 84 which inquires if the enable flag is set. If so a process block 85 generates a right turn cancellation signal and control passes to the summing terminal 80, if not, control directly passes to the summing terminal 80.

A review of the flowchart 70 and the graphic representation of sensor outputs shown in FIG. 6a illustrates how the present invention provides hysteresis. Essentially, once a sensor 00 logic state is provided an enable flag will be set. This flag is set when the rotation of the shaft 11 causes an angular position of between 80° to 280°. However, unlike the turn cancellation apparatus 10 in FIG. 2, no turn cancellation signal is generated just in response to any opposite direction rotation of the shaft 11 passed the 80° and 280° angular position boundaries. What happens is that turn signal cancellation will now be implemented when the shaft 11 is returned to angular positions within 300° to 60° about the nominal 0° angular position. In other words, rotating of the shaft 11 counterclockwise, for example, results in enabling the turn signal cancellation apparatus once an 80° angular position has been achieved, but actual turn signal cancellation will not occur until clockwise rotation (opposite direction rotation) occurs such that an angular position of less than 60° is achieved. Thus 20° of hysteresis has been implemented, and this occurs for both right and left turn cancellation signals. In addition, this hysteresis has been accomplished without the use of any additional sensors. Setting the amount of hysteresis is merely a function of properly designing the angular position of the cams A and B and this represents no substantial problem. Insuring proper operation of this system again involves selecting a high enough sampling frequency to insure that effective sampling pules will occur with sufficient rapidity to detect any significant rotation of the shaft 11.

While specific embodiments of the present invention have been shown and described, further modifications and improvements will occur to those skilled in the art. For example, certainly the microswitches, sense arms and raised cams described in conjunction with the present invention can be replaced by Hall effect devices and raised metallic identifying portions or by photodiodes and light blocking mechanisms. All such modifications which retain the basic underlying principles disclosed and claimed herein are within the scope of this invention.

I claim:

1. An electronic turn signal cancellation apparatus comprising:
   a shaft rotatable about an axis and rotated in accordance with the rotation of a vehicle steering wheel;
   first and second means fixed to said shaft and rotatable therewith, said first and second means positioned at different relative angular positions about said shaft axis with respect to each other and axially spaced apart from each other;
   first and second sensor means located separate from and about said shaft and positioned axially spaced apart from each other and at fixed angular positions with respect to said shaft axis;
   said first sensor means associated with and positioned for sensing the rotation of said first means about said axis and providing a first sensor output signal in accordance therewith, said first output signal being unresponsive to the rotation of said second means, and said second sensor means being associated with and positioned for sensing the rotation of said second means about said axis and providing, in response thereto, a second sensor output signal independent of said first output signal, said second output signal being unresponsive to the rotation of said first means, each of said first and second output signals, respectively, related to the rotational positions of said first and second means about said axis; and
   means for receiving said first and second output signals and providing separate right/left turn signal cancellation signals in accordance therewith.

2. An electronic turn signal cancellation apparatus according to claim 1 wherein said turn signal cancellation means includes means for monitoring a present state of each of said first and second signals and also a previous time occurrence state of each of said first and second signals, and providing, in accordance therewith, said right/left turn signal cancellation signals.

3. An electronic turn signal cancellation apparatus according to claim 2 wherein said turn signal cancellation means includes means for determining rotational direction of said shaft by monitoring said present and previous states of said first and second signals.

4. An electronic turn signal cancellation apparatus according to claim 3 wherein said turn signal cancellation means includes means for generating one right/left turn signal cancellation signal in response to determining when said shaft has first been rotated in a predetermined rotational direction to an angular position which exceeds at least a first predetermined angular position with respect to a nominal angular position of said shaft and that then said shaft has been rotated in an opposite rotational direction to an angular position which is no more than said first predetermined angular position.

5. An electronic turn signal cancellation apparatus according to claim 1 wherein said sensor means are positioned at substantially the same angular position with respect to the rotational axis of said shaft.

6. An electronic turn signal cancellation apparatus according to claim 5 wherein said sensor means are mechanically joined together and form a unitary sensor assembly.

7. An electronic turn signal cancellation apparatus according to claim 6 wherein said turn signal cancellation means includes means for providing one right/left turn signal cancellation signal in response to determining that said shaft has first been rotated in a predetermined rotational direction past at least a first angular position with respect to a nominal angular position of said shaft and that then said shaft has been rotated in an opposite rotational direction to an angular position of less than a second angular position which is no more than said first angular position.

8. An electronic turn signal cancellation apparatus according to claim 7 wherein said first and second angular positions of said shaft are substantially coincident.

9. An electronic turn signal cancellation apparatus according to claim 7 wherein a significant angular difference exists between said first and second angular positions, thereby causing said turn signal cancellation means to effectively implement hysteresis in providing said right/left turn signal cancellation signals.

10. An electronic turn signal cancellation apparatus according to claim 9 wherein said turn signal cancellation circuit means includes; (1) timing means for providing effective sampling pulses, (2) two current position means, each associated with one of said output signals, for effectively receiving said sampling pulses and an associated one of said first and second output signals and effectively sampling these output signals in response to each received sampling pulse and providing a held magnitude, until the occurrence of the next sampling pulse, related to the state of each of said sensor output signals, and (3) two previous position means, both coupled to said timing means and each coupled to an associated one of said current position means for effectively sampling and holding an associated one of the previously held outputs of said current position means in accordance with each of said received sampling pulses.

11. An electronic turn signal cancellation apparatus according to claim 10 wherein said turn signal cancellation means includes means for providing an enable signal in response to at least both of said two current position means together providing held magnitudes indicating a shaft rotational position exceeding a predetermined angular position, and wherein said turn signal cancellation means includes effective gate means for providing either a right or left turn signal cancellation signal in accordance with at least the existence of said enable signal and said current position means indicating an angular position of substantially less than said predetermined angular position, said enable signal being terminated in response to said first and second sensor output signals indicating that said shaft has been returned to an angular position no more than said annular position at which said turn signal cancellation signal was produced.

12. An electronic turn signal cancellation apparatus according to claim 1 wherein said turn signal cancellation circuit means includes; (1) timing means for effective providing sampling pulses at a predetermined frequency, (2) two current position means, each associated with one of said output signals, for effective receiving said sampling pulses and an associated one of said first and second output signals and effectively sampling these output signals in response to each received sampling pulse and providing a held magnitude, until the occurrence of the next sampling pulse, related to the state of each of said sensor output signals, and (3) two previous position means, both coupled to said timing means, each effectively sampling and holding a previous magnitude of an associated one of said sensor signals in response to each of said effectively received sampling pulses.

13. An electronic turn signal cancellation apparatus according to claim 12 wherein said two previous position means are each coupled to an associated one of said current position means for effectively sampling and holding an associated one of the held outputs of said current position means in response to each of said effectively received sampling pulses.

14. An electronic turn signal cancellation apparatus according to claim 1 wherein said first means comprises an angular position identifying portion fixed to said shaft which extends continuously over a predetermined less than 360° circumferential angle about said shaft, said first sensor means sensing the occurrence of this identifying portion of said first means adjacent to said first sensor means during rotation of said shaft and providing said first sensor output signal with a predetermined magnitude in response thereto, and wherein said second means similarly comprises an identifying portion which extends continuously over a less than 360° circumferential angle about said shaft, said second sensor means sensing the occurrence of said second identifying portion adjacent to said second sensor means during rotation of said shaft and providing said second sensor output signal with a predetermined magnitude in response thereto, said first and second identifying portions being angularly shifted about said shaft axis with respect to each other such that said identifying portions are positioned to identify different angular positions of said shaft.

15. An electronic turn signal cancellation apparatus according to claim 14 wherein some portions of said first and second identifying portions exists axially spaced apart on said shaft but concurrently at the same circumferential angular positions about said shaft axis.

* * * * *